United States Patent
Lustig et al.

(10) Patent No.: US 11,764,607 B2
(45) Date of Patent: Sep. 19, 2023

(54) SUSPENSION SPRING

(71) Applicant: Aktiebolaget SKF, Gothenburg (SE)

(72) Inventors: Maarten Lustig, Delft (NL); Sjoerd Van Bracht, Delft (NL); Wouter Van Zoest, Delft (NL); Wout Ypma, Delft (NL)

(73) Assignee: Aktiebolaget SKF, Gothenburg (SE)

( * ) Notice: Subject to any disclaimer, the term of this patent is extended or adjusted under 35 U.S.C. 154(b) by 552 days.

(21) Appl. No.: 16/731,203

(22) Filed: Dec. 31, 2019

(65) Prior Publication Data

US 2020/0220383 A1 Jul. 9, 2020

(30) Foreign Application Priority Data

Jan. 4, 2019 (DE) .......................... 102019200048.7

(51) Int. Cl.
*H02J 50/00* (2016.01)
*F16F 15/02* (2006.01)
*H02N 2/18* (2006.01)
*H02N 2/00* (2006.01)

(52) U.S. Cl.
CPC ............ *H02J 50/001* (2020.01); *F16F 15/02* (2013.01); *H02N 2/006* (2013.01); *H02N 2/186* (2013.01)

(58) Field of Classification Search
CPC .. H02J 50/001; F16F 15/02; F16F 1/18; F16F 1/26; F16F 1/185; F16F 1/021; H02N 2/006; H02N 2/186
USPC ........................................................ 310/329
See application file for complete search history.

(56) References Cited

U.S. PATENT DOCUMENTS

| 3,389,902 A | | 6/1968 | Young | |
|---|---|---|---|---|
| 4,102,586 A | * | 7/1978 | Pearson | F16B 2/241 5/259.1 |
| 4,887,802 A | * | 12/1989 | Wilcox | B60G 11/12 267/148 |
| 5,006,681 A | * | 4/1991 | Postmus | H01H 5/18 267/159 |
| 5,113,047 A | * | 5/1992 | Tsutsumi | H01H 13/48 200/406 |

(Continued)

FOREIGN PATENT DOCUMENTS

| CN | 201331399 | 10/2009 |
|---|---|---|
| CN | 103999348 A | 8/2014 |

(Continued)

OTHER PUBLICATIONS

Chinese Patent Application; File name of submitted document is "5-Notification of the First Office Action".

(Continued)

*Primary Examiner* — John K Kim
(74) *Attorney, Agent, or Firm* — GARCIA-ZAMOR INTELLECTUAL PROPERTY LAW, LLC; Ruy Garcia-Zamor

(57) ABSTRACT

An ortho-planar spring/flexure, a suspension assembly having such a flexure, and a vibration energy harvester including such a suspension assembly, suitable for long term usage in harsh vibrational environments. The flexure provides one or more slots to thereby create parallel springs with a smaller width that will have much lower stress levels when subjected to longitudinal vibrations or shock waves creating large shear forces, and still have a one piece flexure for easy mounting.

13 Claims, 4 Drawing Sheets

(56) References Cited

U.S. PATENT DOCUMENTS

| | | | |
|---|---|---|---|
| 7,692,366 B2 | 4/2010 | Thiesen | |
| 10,805,718 B1 | 10/2020 | Porter et al. | |
| 11,166,096 B1 | 11/2021 | Porter et al. | |
| 2002/0118492 A1* | 8/2002 | Watanabe | G11B 5/5552 |
| 2005/0035687 A1* | 2/2005 | Xu | H02N 2/023 |
| | | | 310/328 |
| 2007/0121062 A1* | 5/2007 | Habermann | G02C 5/008 |
| | | | 351/153 |
| 2010/0122461 A1* | 5/2010 | Minas | H01M 8/2455 |
| | | | 429/433 |
| 2010/0270889 A1 | 10/2010 | Xu | |
| 2014/0117785 A1* | 5/2014 | Furukawa | H02K 7/1876 |
| | | | 310/15 |
| 2015/0145376 A1 | 5/2015 | Sun et al. | |
| 2015/0180374 A1 | 6/2015 | Herder et al. | |
| 2015/0188389 A1* | 7/2015 | Wan | F03G 5/06 |
| | | | 290/1 A |
| 2017/0027587 A1* | 2/2017 | Fraone | A61B 17/155 |
| 2017/0373611 A1 | 12/2017 | Cottone et al. | |
| 2019/0176722 A1* | 6/2019 | Saele | F16B 9/05 |
| 2020/0220383 A1* | 7/2020 | Lustig | F16F 1/18 |
| 2020/0220483 A1* | 7/2020 | Lustig | F16F 1/027 |
| 2021/0044221 A1 | 2/2021 | Jia et al. | |
| 2021/0058011 A1 | 2/2021 | Seshia et al. | |

FOREIGN PATENT DOCUMENTS

| | | |
|---|---|---|
| CN | 106195106 A | 12/2016 |
| CN | 107395063 A | 11/2017 |
| CN | 107681920 A | 2/2018 |
| CN | 107707155 A | 2/2018 |
| CN | 108011543 A | 5/2018 |
| EP | 2489288 | 8/2012 |
| FR | 2675557 A1 | 10/1992 |
| GB | 201801675 | 3/2018 |
| GB | 2576686 B | 3/2020 |
| KR | 20140140378 A | 12/2014 |
| WO | 2006059098 A1 | 6/2006 |
| WO | WO2007119981 | 10/2007 |
| WO | 2017086785 A1 | 5/2017 |

OTHER PUBLICATIONS

Chinese patent application document; File name of submitted document is "3-Notification of the First Office Action 2018P00118CN".

Xu, Guangcan et al., 3-Energy Regenerative Suspension and Its Performance Optimization for Electric Vehicle; Journal of Xi An Jiaotong University; vol. 50 No. 8 Aug. 2016.

Guangcan Xu et al., "Energy Regenerative Suspension and Its Performance Optimization for Electric Vehicle," Journal of Xi'an Jiaotong University, Aug. 2016, pp. 90-95, vol. 50, No. 8, Xi'an 710049, China.

\* cited by examiner

SUSPENSION SPRING

CROSS-REFERENCE TO RELATED APPLICATIONS

This application claims priority to German patent application no. 102019200048.7 filed on Jan. 4, 2019, the contents of which are fully incorporated herein by reference.

TECHNICAL FIELD OF THE INVENTION

The invention concerns suspension assemblies and is more particularly directed to suspension springs of suspension assemblies for vibration energy harvesters.

BACKGROUND OF THE INVENTION

More and more machine parts are being monitored to determine a condition of the machine part. The monitoring is usually done with one or more sensors to measure one or more physical parameters and transduce these physical parameters into electrical signals, which signals are possibly signal processed. To get these signals as raw data, preprocessed data, or just an indication of the condition of the machine part to a suitable place such as a control room or the like, there will be some sort of communication unit. In most cases the communication unit will transfer the information wirelessly. In many of the locations where there is a desire to perform condition monitoring there is no power easily available. A battery then becomes necessary, or if a long-term maintenance-free sensor unit is desired, then some kind of energy harvester becomes necessary.

Energy harvesting can be done in many different manners. Solar cell will in many cases not work as the machine part that it is desired to monitor is most likely in an enclosed space, such as a building. Vibration energy harvesters will work in any environment, light or dark, as long as there are vibrations available. Since condition monitoring is often done on rotating machine parts, such as shaft and bearings, vibrations are available. US2015/0180374 and WO2017/086785 describe vibration energy harvesters. In theory a vibration energy harvester will produce energy as long as there are vibrations, however a vibration energy harvester comprises moving parts and these moving parts can degrade quickly in very harsh environments with vibrations up to 100 g, such as for example condition monitoring of train bearings and axels. At the same time it is desirable that the condition monitoring equipment does not require maintenance more often than the machine part that they monitor requires. There is still room for improvements.

SUMMARY OF THE INVENTION

An object of the invention is to define a suspension assembly and its suspension springs, and an energy harvester comprising such a suspension assembly with its suspension springs, for harsh environments where high g-forces are present.

The aforementioned object is achieved according to the invention by an ortho-planar spring having a thickness, a width, and a length. The thickness is at least one order of magnitude smaller than either the length or the width. The spring further has across its width a first end and a second end. The first end and the second end being located at opposite ends along the length of the spring. The spring comprises three areas, a first and a second connection area, and a spring area. The first connection area at the first end of the spring spans across the width of the spring and along a part of the length of the spring from the first end of the spring. The second connection area at the second end of the spring spans across the width of the spring and along a part of the length of the spring from the second end. The spring area, suitably being rectangular, spans across the width of the spring and along the length of the spring between the first connection area and the second connection area. According to the invention, the spring area comprises at least one slot having a first endpoint and a second endpoint. The at least one slot runs along the length of the spring in such a way that the spring is in one piece without reaching the first end or the second end.

In some embodiments, the first endpoint enters into the first connection area and/or the second endpoint enters into the second connection area of at least one of the at least one slots.

In some embodiments, at least one of the at least one slot is straight at least within the spring area.

In some embodiments, a width of at least one of the at least one slot is constant at least within the spring area.

In some embodiments, the width of the spring is constant at least within the spring area.

In some embodiments, the length of the spring is larger than the width of the spring and in other embodiments the width of the spring is larger than the length of the spring.

In some embodiments, the spring is made of a metallic material, such as spring steel, while in other embodiments the spring is made of a non-metallic material, such as a polymer.

The different additional enhancements of the ortho-planar spring according to the invention can be combined in any desired manner as long as no conflicting features are combined.

The aforementioned object is further achieved according to the invention, by a suspension assembly comprising a suspension frame and a supporting frame. The suspension frame is movably coupled to the supporting frame in such a way that the suspension frame is movable, suitably only substantially in one direction, in relation to the supporting frame. According to the invention the suspension assembly further comprises at least two ortho-planar springs as described above. In some embodiments the suspension frame is movably coupled to the supporting frame by means of the at least two ortho-planar springs, where two of the at least two ortho-planar springs are coupled in parallel and are displaced in relation to each other in a direction equal to a major movement direction of the springs and the suspension frame. The supporting frame then suitably comprises two sloped stopper surfaces, each one of the sloped stopper surfaces being located in a vicinity to where a respective one of the two ortho-planar springs is attached to the supporting frame. Then the suspension frame suitably comprises two sloped stopper surfaces, each one being located such that when in use each one mates with one corresponding sloped stopper surface of the supporting frame.

Advantageously the sloped stopper surfaces are angled such that during use over an operating range of relative movement between the supporting frame and the suspension frame, a distance between each pair of mating sloped surfaces stays substantially the same. This is under normal operating conditions, when subjected to severe shocks and extreme vibrations, the mating sloped surfaces will collide and the suspension assembly will momentarily stop operating. However, since the operating distance between mating sloped surfaces is very small, in the magnitude of 0.1 mm, the springs/flexures are only subjected to a limited amount of stress.

The different additional enhancements of the suspension assembly according to the invention can be combined in any desired manner as long as no conflicting features are combined.

The aforementioned object is further achieved according to the invention by a vibration energy harvester. The harvester comprises a suspension assembly with a coil that will in use move in relation to a magnetic field due to vibrations that the suspension assembly is subjected to. The harvester further comprises an electronics unit that is coupled to the coil and that comprises means to regulate and store energy generated by the coil moving in the magnetic field, protective circuit means to protect the coil and the electronics unit, and output means to thereby be able to supply energy from the energy harvester to an energy consumer. According to the invention, the suspension assembly is a suspension assembly as described above and in that magnets are located fixed in relation to the supporting frame of the suspension assembly.

The aforementioned object is further achieved according to the invention by an ortho-planar spring/flexure, a suspension assembly comprising such a flexure, and a vibration energy harvester comprising such a suspension assembly, suitable for long-term usage in harsh vibrational environments. The flexure comprises one or more slots to thereby create parallel springs with a smaller width that will have much lower stress levels when subjected to longitudinal vibrations or shock waves creating large shear forces, and still have a one-piece flexure for easy mounting.

A primary purpose of the invention is to provide an ortho-planar spring, a flexure, in one piece that can be easily mountable and still having low-stress levels when subjected to shear forces. This is obtained according to the invention by creating parallel springs by adding one or more slots. The flexure according to the invention can advantageously be used in suspension assemblies of a vibration energy harvester that are located in harsh environments. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION OF THE INVENTION

In order to clarify the method and device according to the invention, some examples of its use will now be described in connection with FIGS. 1 to 5.

Figure 1:
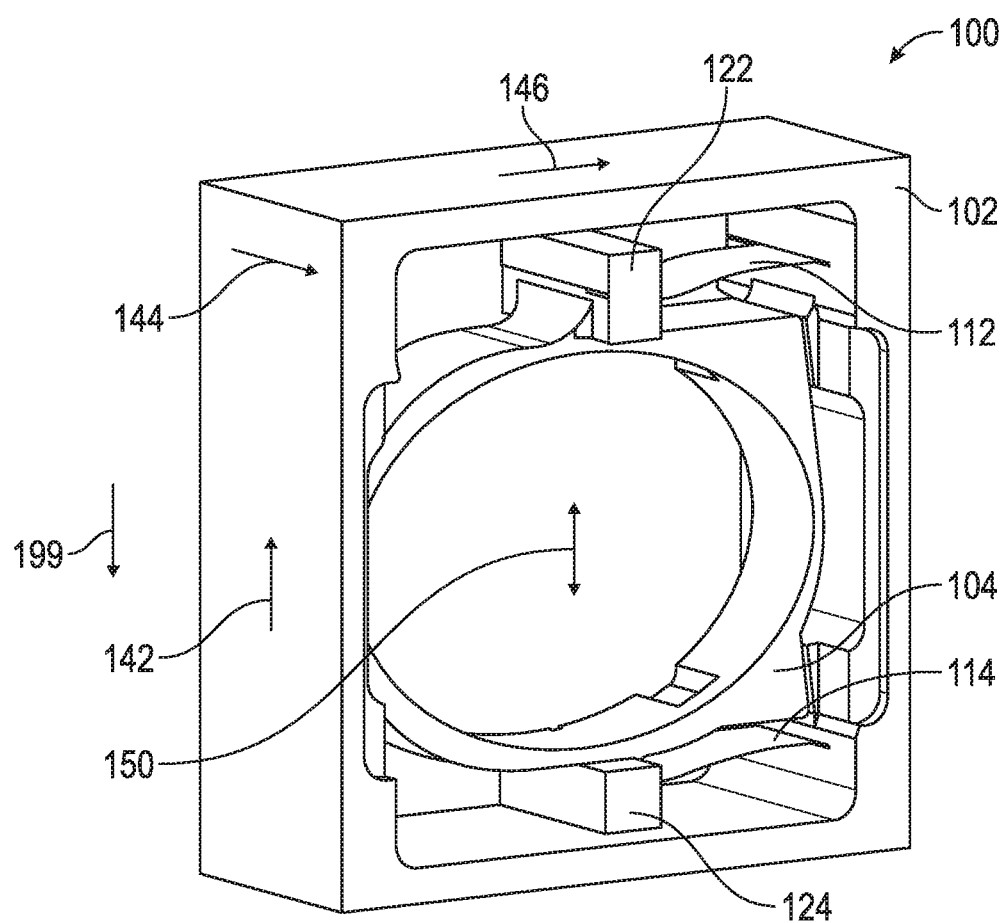
FIG. 1 illustrates an isometric view of a suspension assembly where flexures/springs according to the invention are suitably mounted as suspension springs.

FIG. 1 illustrates an isometric view of a suspension assembly 100 where flexures/springs according to the invention are suitably mounted as suspension springs 112, 114. The suspension assembly 100 comprises a supporting frame 102 and a suspension frame 104. The suspension frame 104 is suspended in the supporting frame 102 by means of one or more suspension springs/flexures 112, 114. There are suitably at least two ortho-planar springs 112, 114 to restrict movement 150 of the suspension frame 102 to a vertical direction 142 as much as possible. The illustrated suspension assembly 100 is intended to be used in a vibration energy harvester, which would then also comprise a wound coil in the suspension frame and magnets on either side of the supporting frame 102, creating a moving 150 coil in a magnetic field. When in use the supporting frame 102 is aligned with gravity 199 such that the suspension frame 104 can move 150 relative to the supporting frame 102 when there are vibrations in the vertical direction 142. In a preferred the characteristics of the suspension springs 112, 114, in relation to the total weight of the suspension frame 104 with a coil, are such that when in rest, the suspension frame 104 attains a neutral position such that within the restrictions of two stoppers 122, 124 it can move 150. When the supporting frame 102 is subjected to vibrations in the vertical direction 142, the supporting frame 102 with the magnets will move with the vibrations and due to the characteristics of the suspension springs 112, 114, the suspension frame 104 will react dynamically to said vibrations, creating a relative movement between the coil and the magnets. The stoppers 122, 124, here illustrated as being part of, or attached to, the suspension frame 104 can of course also be wholly or in part being part of, or attached to, the supporting frame 102. The stoppers 122, 124 are to restrict the vertical 142 movement 150 of the suspension frame 104 in relation to the supporting frame 102 when vibrations or shock waves in the vertical direction 142 becomes so large that the suspension springs 112, 114 would be subjected to damaging stresses. In this embodiment the stoppers have a second use of being the connection/clamping points of the suspension springs 112, 114 onto the suspension frame 104.

Ideally vibrations would only appear in the vertical direction 142. However, vibrations and shock waves might also appear in a longitudinal direction 144 and a transverse direction 146, especially in harsh environments such as being mounted on a freight railway bearing. The suspension frame 104 will to some degree restrict movement of itself in the longitudinal direction 144, but there must be a balance between restricting movement in the longitudinal direction 144 and the play needed between the coil and the magnets to not restrict movement 150 in the vertical direction 142. The longitudinal direction 144 relative movement between the suspension frame 104 and the supporting frame 102 causes extremely harmful shear forces on the suspension springs 112, 114 resulting in high-stress levels that cause material fatigue. A high amount of cycles at high-stress levels will degrade the performance of the suspension springs 112, 114 and eventually cause them to break. Any vibrations or shock waves in the transversal direction 146 are being restricted by only a play existing between the supporting frame 102 and the suspension frame 104. Even though the play might be small, if the shock waves and vibrations in the transverse direction 146 are large and frequent, they can cause severe damage to the suspension springs 112, 114 due to being subjected to high-stress levels.

Figure 2:
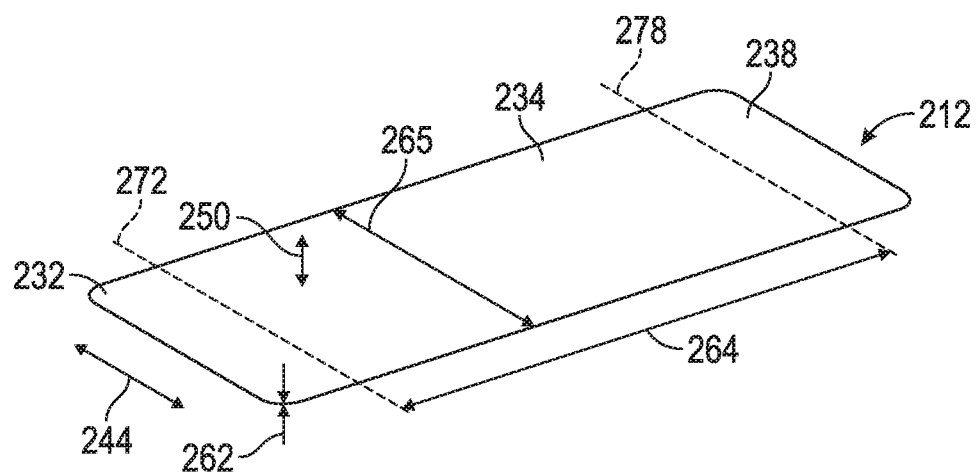
FIG. 2 illustrates an isometric view of a flexure/spring.

FIG. 2 illustrates an isometric view of an ortho-planar flexure/spring 212. The flexure 212 is a flat piece that is divided into three areas as divided by two lines 272, 278. There is a first connection/clamping area 232, a spring area 234, and a second connection/clamping area 238. Only the spring area 234 functions as a spring and the characteristics of it depends on the length 264, width 265, thickness 262, and the material it is made of. The material is most commonly a metal, such as spring steel. The two connection/clamping areas 232, 238 are for connection and they are assumed for this illustration to be clamped stiff at the connection points up to each respective line 272, 278 across the width 265 of the flexure 212. In use, in a suspension assembly according to FIG. 1, one flexure 212 will be used for each of the two suspension springs 112, 114. For the sake of this description, it is chosen that for each flexure 212 the connection/clamping area 238 is clamped into the supporting frame 102 and the connection/clamping area 232 is clamped into the suspension frame 104. It can be the other way around since the flexure is the same in relation to both sides. The end of each flexure 212 that is clamped to the supporting frame 102, will be fixed in relation to the supporting frame 102. The end of each flexure 212 that is clamped to the suspension frame 104 will move 250 together with the suspension frame 104.

As mentioned above, vibrations and shock waves in the longitudinal direction 244, can cause problems, especially in harsh environments such as train applications, where shock waves up to a 100 g can appear, and thereby causing enormous shear stresses on the flexure 212. This can result in fatigue of the flexure 212, resulting in a limited usable life of the flexure 112 and thus of the suspension assembly 100 and of a vibration energy harvester comprising these components.

Figure 3:
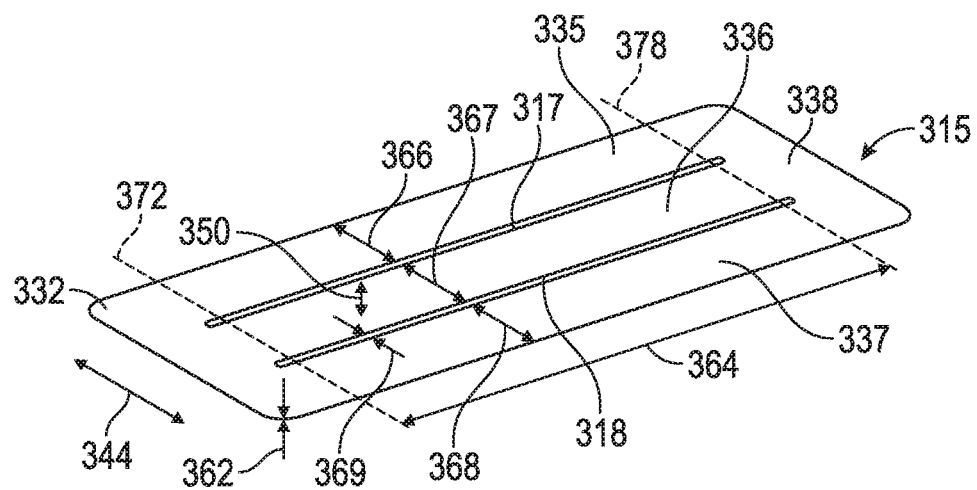
FIG. 3 illustrates an isometric view of a flexure/spring according to the invention.

FIG. 3 illustrates an isometric view of an ortho-planar flexure/spring 315 according to the invention. The flexure 315 according to the invention comprises one or more parallel straight slots, in the illustrated embodiment there are two parallel straight slots 317, 318 evenly distributed. In other embodiments, one or more of the slots can be non-straight, such as wavy or curved. In still other embodiments the one or more slots are not evenly distributed, giving each of the springs different characteristics.

The flexure 315 is in this embodiment divided into five different areas as divided by two lines 372, 378, and the two slots 317, 318. The five areas comprise a first connection/clamping area 332, three spring areas 335, 336, 337, and a second connection/clamping area 338. The straight slots 317, 318 will cross the two lines 372, 378 and enter into the connection/clamping areas 332, 338. When in use, ends of the straight slots 317, 318 will not be visible and in this embodiment, it will look like there are three independent ortho-planar flexures/springs. In other embodiments, the one or more slots will not cross one or both of the two lines 372, 378, creating a combination of serial and parallel springs. Only the spring 315 areas 335, 336, 337 function as springs and the characteristics of them depend on the length 364, width of each respective one 366, 367, 368, thickness 362, and the material it is made of. The width of each slot can be constant or varying. The material is most commonly a metal, such as spring steel.

The three spring areas 335, 336, 337 act as a set of three parallel springs. The number of parallel springs can be just two with having just one slot, or there can be more parallel springs by introducing more straight slots. By having parallel springs, there will be a reduced stress on each one of the springs in comparison to the ortho-planar flexure/spring as illustrated in FIG. 2. When there are vibrations or shock waves in the shear direction 344 of the flexure 315 there is a significantly reduced stress as in that direction the stress as the second moments of area is reduced significantly. This will result in a longer life expectancy of the flexure in relation to having a flexure according to FIG. 2. One way of attaining the same characteristic in the motion direction 350 as the flexure of FIG. 2, with the thickness 362 being the same, then the spring areas should also be the same, that is the flexure 315 can for example be wider by the added widths 369 of all the slots 317, 318.

A big advantage is also that the flexure is still a single piece, which enables the assembly to be done as a single flexure, but it acts after assembly as a set of multiple parallel springs.

The two connection/clamping areas 332, 338 are for connection and they are assumed for this illustration to be clamped stiff at the connection points up to each respective line 372, 378 across the width of the flexure 315, creating three independent parallel springs. In use, in a suspension assembly according to FIG. 1, a flexure 315 will be used for each of the two suspension springs 112, 114.

For this embodiment it is chosen that for each flexure 315 the connection/clamping area 338 is clamped into the supporting frame 102 and the connection/clamping area 332 is clamped into the suspension frame 104. It can be the other way around since the flexure is the same seen from either side. The end of each flexure 315 that is clamped to the supporting frame 102, will be fixed in relation to the supporting frame 102. The end of each flexure 315 that is clamped to the suspension frame 104 will move 350 together with the suspension frame 104.

Figure 4:
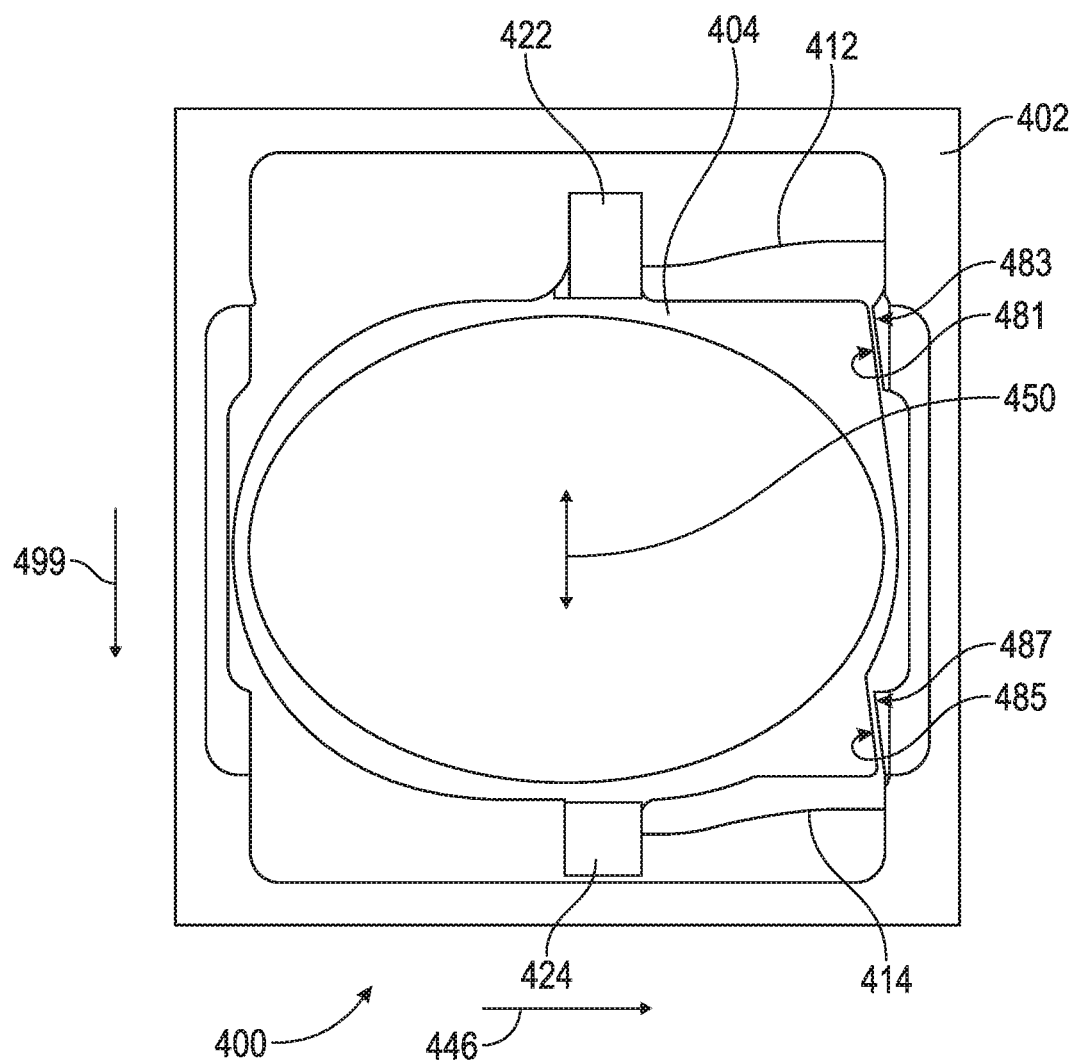
FIG. 4 illustrates a side view of a suspension assembly according to another aspect of the invention.

FIG. 4 illustrates a side view of a suspension assembly 400 according to another aspect of the invention to especially be able to handle undesired transverse 446 vibrations and shock waves. The suspension assembly 400 comprises a supporting frame 402 and a suspension frame 404. The suspension frame 404 is suspended in the supporting frame 402 by means of one or more suspension springs 412, 414. When the supporting frame 402 is aligned with gravity 499 the suspension frame 404 can move 450 relative to the supporting frame 402. The suspension frame 404 suitably has a neutral position within the restrictions of two stoppers 422, 424.

Ideally vibrations would only appear in the vertical direction. However vibrations and shock waves might also appear in a transverse direction 446, especially in harsh environments such as being mounted on a freight railway bearing. Any vibrations or shock waves in the transversal direction 446 are being restricted by a distance existing between the supporting frame 402 and the suspension frame 404. Bending stresses of the flexures 412, 414 will be increasing until the suspension frame 404 hits the supporting frame 402 on the flexure side.

Even though the distance might not be very big, if the shock waves and vibrations in the transverse direction 446 are large and frequent, they can cause severe damage to the suspension springs 412, 414 due to being subjected to large bending stresses. So according to the other aspect of the invention, the distance between the suspension frame 404 and the supporting frame 402 can be made very small in a controlled manner over the operating range movement 450 of the suspension frame 404 by mating sloped surfaces.

The sloped stopper surfaces 481, 483, 485, 487 are also used during assembly of a suspension frame 404 in a supporting frame 402. The assembly of the suspension springs/flexures 412, 414, 315 as connection points between a suspension frame 404 and a supporting frame 402 is done with the aid of an assembly tool. The flexures 412, 414, 315 are in a straight position during assembly.

The assembly tool restrains the suspension frame 404 such that in relation to the supporting frame 402 it can only move in the transverse direction 446. Suitably shims are used between the mating sloped stopper surfaces 481, 483, 485, 487 to be able to attain a desired small distance between the mating sloped surfaces 481, 483, 485, 487 when in use. With shims between the mating sloped stopper surfaces 481, 483, 485, 487 the suspension frame 104 is moved in the transverse direction 446 towards the sloping stopper surfaces 483, 487 of the supporting frame 402. The suspension springs/flexures 412, 414, 315 are then fastened to the supporting frame 401 and the suspension frame 404.

Figure 5:
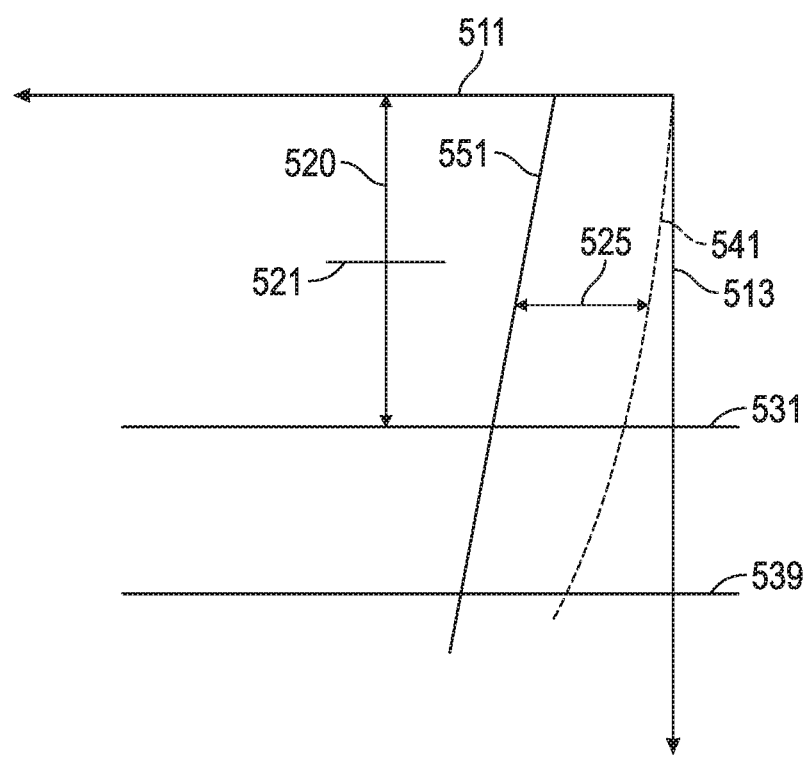
FIG. 5 illustrates a graph showing the influence of the movement of the suspension frame in relation to the support frame in view of the sloped stopper surfaces.

FIG. 5 illustrates a graph showing the influence of the movement of the suspension frame in relation to the support frame in view of the sloped stopper surfaces.

Referring to both FIG. 4 and FIG. 5, the negative y-axis 513 represents an offset vertical movement 450 of the suspension frame 404 over its operating range 520, with an indicated suitable balance position 521 of the suspension frame 404. The negative x-axis 511 represents an offset transversal 446 distance between the suspension frame 404 and the supporting frame 402.

When the suspension frame 404 moves 450 up and down, the suspension frame 404 does not move in a straight line, but a slightly curved line 541. This is the result of the so-called parasitic motion that is due to the flexures 412, 414 bending. The flexures' 412, 414 connection points with the suspension frame 404 will follow a slightly bent curve, see 541 in FIG. 5. This would result in a gap between the suspension frame 404 and the supporting frame 402 to vary. According to this other aspect of the invention, the surfaces 481, 483, 485, 487 between the suspension frame 404 and the supporting frame 402 that are closest to each other, have linear matching slopes 551 on both sides. The linear slope is such that over the operating range 520 of the suspension frame, the gap 525 between mating surfaces 481 485 of the suspension frame 404 and the mating surfaces 483, 487 of the supporting frame 402 is fairly constant, varying very little.

This results in several advantages. The gap distance between the mating surfaces 481, 483, 485, 487 can be properly controlled and made to be extremely small. This leads to lower stresses of the flexures 412, 414 when there are vibrations or shock waves in the transversal direction 446. This will give the flexures 412, 414 a longer lifetime.

The invention is based on the basic inventive idea of including one or more slots in a flexure to thereby create parallel springs with a smaller width that will have much lower stress levels when subjected to longitudinal vibrations or shock waves and still have a one-piece flexure for easy mounting. The invention is not restricted to the above-described embodiments but may be varied within the scope of the following claims.

REFERENCE ELEMENT LISTING

FIG. 1 illustrates an isometric view of a suspension assembly where flexures/springs according to the invention are suitably mounted as suspension springs:
  100 Suspension assembly,
  102 Supporting frame,
  104 Suspension frame,
  112 First suspension spring,
  114 Second suspension spring,
  122 Upper stopper,
  124 Lower stopper,
  142 Vertical direction
  144 Longitudinal direction
  146 Transverse direction
  150 Direction of suspension frame movement,
  199 Gravity FIG. 2 illustrates an isometric view of a flexure/spring:
  212 Flexure/spring,
  232 Connection/clamping area to a suspension frame,
  234 Flexure/spring area,
  238 Connection/clamping area to a supporting frame,
  244 Longitudinal direction,
  250 Flexure/spring and a connected suspension frame direction of movement when in use,
  262 Thickness of Flexure/spring,
  264 Length of flexure/spring area,
  265 Width of flexure/spring area,
  272 Flexure/spring area border to connection/clamping area of a suspension frame,
  278 Flexure/spring area border to connection/clamping area of a supporting frame.

FIG. 3 illustrates an isometric view of a flexure/spring according to the invention:
  315 Flexure/spring according to the invention,
  317 First slot,
  318 Second slot,
  332 Connection/clamping area to a suspension frame,
  335 First flexure/spring area,
  336 Second flexure/spring area,
  337 Third flexure/spring area,
  338 Connection/clamping area to a supporting frame,
  344 Longitudinal direction,
  350 Flexure/spring and a connected suspension frame direction of movement when in use,
  362 Thickness of Flexure/spring,
  364 Length of flexure/spring areas,
  366 Width of the first flexure/spring area,
  367 Width of the second flexure/spring area,
  368 Width of the third flexure/spring area,
  369 Width of the slots between the flexure/spring areas,
  372 Flexure/spring areas border to connection/clamping area of a suspension frame,
  378 Flexure/spring areas border to connection/clamping area of a supporting frame.

FIG. 4 illustrates a side view of a suspension assembly according to another aspect of the invention:
  400 Suspension assembly,
  402 Support frame,
  404 Suspension frame
  412 First suspension spring,
  414 Second suspension spring,
  422 Upper stopper,
  424 Lower stopper,
  446 Transverse direction,
  450 Flexure/springs and the connected suspension frame direction of movement when in use,
  481 First sloped stopper surface on the suspension frame,
  483 First sloped stopper surface on the support frame mating with the first sloped stopper surface on the suspension frame,
  485 Second sloped stopper surface on the suspension frame,
  487 Second sloped stopper surface on the support frame mating with the second sloped stopper surface on the suspension frame,
  499 Gravity.

FIG. 5 illustrates a graph showing the influence of the movement of the suspension frame in relation to the support frame in view of the sloped stopper surfaces:

- 511 An offset transverse distance between the support frame and the suspension frame,
- 513 An offset vertical distance between the support frame and the suspension frame,
- 520 Working range of the suspension frame,
- 521 Midpoint of working range,
- 525 Gap distance between the sloped stopper surfaces of the on the suspension frame and the sloped stopper surfaces of the support frame,
- 531 Working range limit,
- 539 Suitable distance/place of the lower stopper,
- 541 Parasitic movement of the suspension frame,
- 551 Slope of sloped surfaces.

The invention claimed is:

1. An ortho-planar spring having a spring thickness, a spring width, and a spring length, the spring thickness being at least one order of magnitude smaller than either the spring length or the spring width, the ortho-planar spring further having a first end and a second end, the first end and the second end being located at opposite ends of the spring length, and wherein the ortho-planar spring comprises three areas:
   a first connection area at the first end of the ortho-planar spring spanning across the spring width and along a first part of the spring length from the first end, the ortho-planar spring being a flat piece,
   a second connection area at the second end of the ortho-planar spring spanning across the spring width and along a second part of the spring length from the second end,
   and a spring area spanning across the spring width in a longitudinal direction and along the spring length between the first connection area and the second connection area, wherein
   the spring area comprises at least one slot which is free of material therein, the at least one slot having a first slot endpoint and a second slot endpoint, the at least one slot running along the spring length in such a way that the ortho-planar spring is in one piece, the first slot endpoint being in the first connection area and the second slot endpoint being in the second connection area.

2. The ortho-planar spring according to claim 1, wherein the spring area comprises at least two slots.

3. The ortho-planar spring according to claim 1, wherein at least one of the at least one slot is straight at least within the spring area.

4. The ortho-planar spring according to claim 1, wherein a slot width of at least one of the at least one slot is constant at least within the spring area.

5. The ortho-planar spring according to claim 1, wherein the spring width is constant at least within the spring area.

6. The ortho-planar spring according to claim 1, wherein the spring length is larger than the spring width.

7. The ortho-planar spring according to claim 1, wherein the at least one slot extending entirely in the longitudinal direction with a constant thickness, as measured in a direction perpendicular to the longitudinal direction, along an entire slot length.

8. An ortho-planar spring having a spring thickness, a spring width, and a spring length, the spring thickness being at least one order of magnitude smaller than either the spring length or the spring width, the ortho-planar spring further having a first end and a second end, the first end and the second end being located at opposite ends of the spring length, and wherein the ortho-planar spring comprises three areas:
   a first connection area at the first end of the ortho-planar spring spanning across the spring width and along a first part of the spring length from the first end, the ortho-planar spring being a flat piece,
   a second connection area at the second end of the ortho-planar spring spanning across the spring width and along a second part of the spring length from the second end,
   and a spring area spanning across the spring width in a longitudinal direction and along the spring length between the first connection area and the second connection area, wherein
   the spring area comprises at least two slots each of which is free of material therein, the at least two slots each having a first slot endpoint and a second slot endpoint, the at least two slots each running along the spring length in such a way that the ortho-planar spring is in one piece, the first slot endpoint being in the first connection area and the second slot endpoint being in the second connection area.

9. The ortho-planar spring according to claim 1, wherein the ortho-planar spring is made of a metallic material.

10. The ortho-planar spring according to claim 8, wherein the ortho-planar spring is made of a non-metallic material.

11. A suspension assembly comprising:
   a suspension frame, and
   a supporting frame, the suspension frame being movably coupled to the supporting frame in such a way that the suspension frame is movable in relation to the supporting frame, wherein
   the suspension frame is movably coupled to the supporting frame by means of at least two ortho-planar springs each having a spring thickness, a spring width and a spring length, the spring thickness being at least one order of magnitude smaller than either the spring length or the spring width, the at least two ortho-planar springs each further having a first end and a second end, the first end and the second end being located at opposite ends along the spring length, and wherein the at least one ortho-planar spring comprises three areas:
   a first connection area at the first end of each of the at least two ortho-planar springs spanning across the spring width and along a first part of the spring length from the first end,
   a second connection area at the second end each of the at least two ortho-planar springs spanning across the spring width and along a second part of the spring length from the second end,
   and a spring area spanning across the spring width in a longitudinal direction and along the spring length between the first connection area and the second connection area, wherein
      the spring area comprises at least one slot which is free of material therein, the at least one slot having a first slot endpoint and a second slot endpoint, the at least one slot running along the spring length in such a way that the at least one ortho-planar spring is in one piece, the first slot endpoint being in the first connection area and the second slot endpoint being in the second connection area,
   wherein the suspension frame is coupled to the supporting frame with the at least two ortho-planar springs coupled in parallel and are displaced in relation to each other in a direction equal to a major movement direction of the at least two ortho-planar springs and the suspension frame, the supporting frame having two sloped stopper supporting frame surfaces, each the two sloped stopper supporting frame surfaces being located in a vicinity to where a respective one of the at least two ortho-planar springs is attached to the supporting frame, the suspension frame having two sloped stopper suspension frame surfaces, each being located such that when in use each mates with a corresponding one of the two sloped stopper supporting frame surfaces, wherein the two sloped stopper supporting frame surfaces and the two sloped stopper suspension frame surfacese are angled such that during use over an operating range of relative movement therebetween a distance between each pair of opposing mating sloped surfaces stays substantially the same.

12. The ortho-planar spring according to claim 11, wherein the at least one slot extending entirely in the longitudinal direction with a constant thickness, as measured in a direction perpendicular to the longitudinal direction, along an entire slot length.

13. A suspension assembly comprising:
a suspension frame, and a supporting frame, the suspension frame being movably coupled to the supporting frame in such a way that the suspension frame can move in relation to the supporting frame, the supporting frame being rectangular in shape, wherein
the suspension frame is movably coupled to the supporting frame by means of at least two ortho-planar springs each having a spring thickness, a spring width, and a spring length, the spring thickness being at least one order of magnitude smaller than either the spring length or the spring width, the at least two ortho-planar springs each being rectangular in shape, each of the at least two ortho-planar springs further having across the spring width a first end and a second end, the first end and the second end being located at opposite ends of the spring length, and wherein each of the at least two ortho-planar springs comprises three areas:
a first connection area at the first end and spanning across the spring width and along a part of the spring length from the first end,
a second connection area at the second end thereof spanning across the spring width and along a part of the spring length from the second end,
and a spring area spanning across the spring width and along the spring length between the first connection area and the second connection area, wherein
the spring area comprises at least two slots each having a first endpoint and a second endpoint, the at least two slots running along the spring length in such a way that each of the at least two ortho-planar springs is in one piece, the first slot endpoint being in the first connection area and the second slot endpoint being in the second connection area, and
magnets being fixed in relation to the supporting frame of the suspension assembly, wherein the suspension frame is coupled to the supporting frame with the at least two ortho-planar springs coupled in parallel and are displaced in relation to each other in a direction equal to a major movement direction of the at least two ortho-planar springs and the suspension frame.

\* \* \* \* \*